United States Patent [19]

Bucklin et al.

[11] E Re. 30,158

[45] Reissued Nov. 20, 1979

[54] FUSING RESISTOR

[75] Inventors: James B. Bucklin, Brazil; Jay Utken, Frankfort, both of Ind.

[73] Assignee: P. R. Mallory & Co. Inc., Indianapolis, Ind.

[21] Appl. No.: 513,454

[22] Filed: Oct. 9, 1974

Related U.S. Patent Documents

Reissue of:

[64] Patent No.: 3,735,318
Issued: May 22, 1973
Appl. No.: 195,689
Filed: Nov. 4, 1971

[51] Int. Cl.[2] ..... H01H 85/06

[52] U.S. Cl. ..... 337/166; 337/163; 337/296; 338/300

[58] Field of Search ..... 337/296, 160, 163, 167, 337/184, 297, 166, 290; 338/256, 257, 300, 308, 309

[56] References Cited

U.S. PATENT DOCUMENTS

| | | | |
|---|---|---|---|
| 2,672,542 | 3/1954 | Fisher | 337/167 |
| 2,873,327 | 2/1959 | Bernstein | 337/296 X |
| 2,876,312 | 3/1959 | Frederick | 337/163 X |
| 3,289,139 | 11/1966 | Hyde | 338/300 X |

FOREIGN PATENT DOCUMENTS 1196765 7/1965 Fed. Rep. of Germany .

*Primary Examiner*—Harold Broome
*Attorney, Agent, or Firm*—Hoffmann, Meyer & Coles

[57] ABSTRACT

A layer of material is disposed over at least a portion of a resistive film of a resistor. The material having a melting point lower than the melting point of the resistive film and when melted, chemically reacts with the resistive film to render at least a portion of the film non-conductive.

13 Claims, 2 Drawing Figures

FUSING RESISTOR

Matter enclosed in heavy brackets [ ] appears in the original patent but forms no part of this reissue specification; matter printed in italics indicates the additions made by reissue.

This invention relates to resistors and, more particularly, to thin film resistors.

The reliability and stability of thin film resistors such as tin oxide film resistors is well known. Indeed, in tin oxide film resistors the stability is so great that when electrically overloaded the resistor may become red hot and ignite combustible material near by. Rather than having such stability, a more desirable condition would be for the resistor to maintain its stability under temporary overloads that might be encountered in normal operation, but to open circuit or fuse under prolonged or severe overloads.

The present invention, therefore, relates to thin film resistors and has as one of its objects the provision of a thin film resistor which may be open circuited when subjected to severe overloads.

Another object of the invention is the provision of a thin film resistor having a layer of a material disposed on at least a portion of the resistive film which under severe overload conditions will render a portion thereof non-conductive.

A further object of the invention is the provision of a tin oxide film resistor which may be open circuited under severe overload conditions.

Still another object of the invention is the provision of a thin film resistor having a layer of material disposed on at least a portion of the resistive film which has a melting point below the melting point of the resistive film and which when melted chemically reacts with the film to render a portion thereof non-conductive.

Yet another object of the invention is the provision of a tin oxide film resistor having a layer of low melting glass frit disposed on at least a portion of the film such that when the resistor is subjected to severe overloads, the glass frit will melt and chemically react with the film so that at least a portion of the film will be made to be non-conductive.

Figure 1:
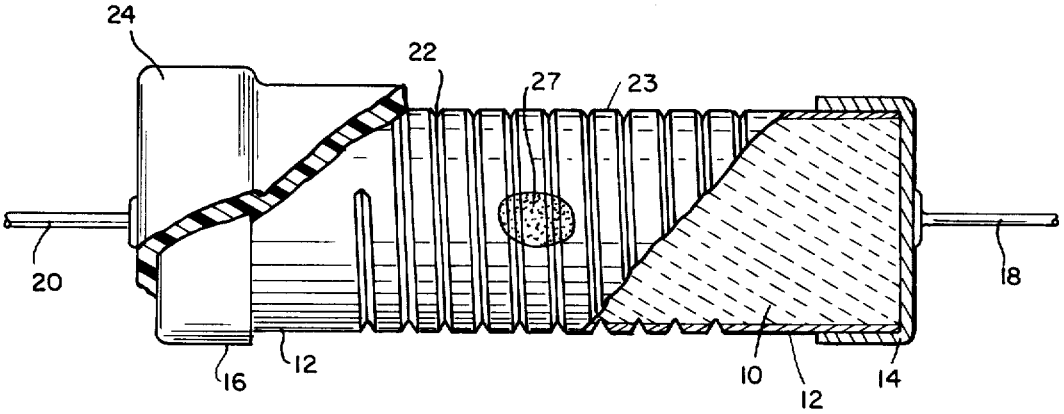
Figure 2:
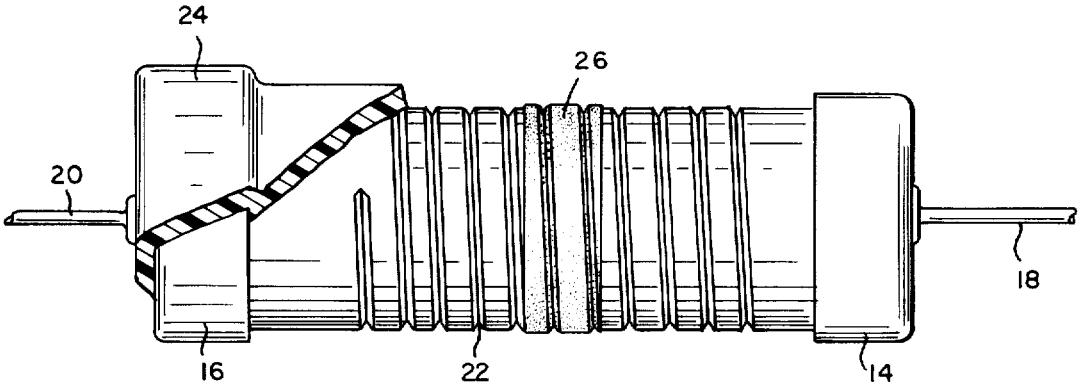

These and other objects of the invention will become apparent from the following description taken in conjunction with the accompanying drawings wherein FIGS. 1 and 2 are cross sections of a resistor employing the principles of the invention and showing different embodiments of the invention.

Generally speaking, the invention provides a method of open circuiting a thin film resistor which generally comprises providing a layer of material over at least a portion of the thin film, the material having a melting point below the melting point of the thin film and which when melted chemically reacts with the thin film to render it non-conductive. The resistor of the present invention in general comprises a non-conductive substrate, a resistive film on the substrate, a layer of material disposed on at least a portion of the film and having a melting point below the melting point of the resistive film which when melted chemically reacts with the film to render a portion thereof non-conductive.

Referring now to the drawing, the resistor of the present invention includes a substrate 10 to which there has been applied a resistive film 12, metallic end caps 14 and 16, electrical lead terminals 18 and 20, and protective cover 24. As shown, the substrate is a solid rod; however, it may be tubular if desired. The substrate may be fabricated of a material having a low coefficient of expansion such as a ceramic or alkali free glass. While the resistive film 12 may be of several types of material, the invention is particularly adaptable to a tin oxide based film because of its high reliability and stability. Spiralled grooves 22 are provided in the film in order to provide a spiral resistance path 23 of predetermined length to yield a desired resistance. End caps 14 and 16 are fitted over film 12 and secured thereby by virtue of being a press fit. Protective cover 24 is an electrically insulative material.

As previously noted, a resistor such as this, especially one having a tin oxide based film, has a high degree of stability such that when the resistor is subjected to prolonged or severe overloads the resistor may become red hot and ignite any combustible material nearby. According to the present invention, such red hot heating of the resistor is prevented by providing a layer 26 of material to at least a portion of the resistive film, the material being such that it will have a melting point lower than the resistive film 12 and which will, when melted, chemically react with the film to dissolve or otherwise render a portion of the film non-conductive thereby opening the circuit. As shown in FIG. 2, the layer 26 should cover at least one spiral resistance path and is preferably located at or near the center of the resistor. The layer may extend around the entire circumference or periphery of the resistor. Alternatively, as shown in FIG. 1, the layer may include a spot 27, so long as at least one spiral resistive path is covered by the spot. When used in conjunction with a tin oxide based film, a suitable material for the layer 26 would be a low melting glass frit such as soda-lime glass. The layer may be applied to the resistive film by some suitable process such as by brushing or roll coating with the aid of a suitable vehicle such as water prior to the protective cover 24 being applied.

What is claimed is:

1. A resistor comprising:

a non-conductive substrate, a resistive tin oxide based film on said substrate, a layer of glass frit material disposed on at least a portion of said resistive tin oxide based film having a melting point below the melting point of said resistive film which when melted chemically reacts with said film to render said portion thereof non-conductive, metallic caps disposed at opposed ends of said substrate and overlying said film, electrical leads coupled to said end caps, and an insulative cover substantially surrounding said film and said caps.

2. A resistor according to claim 1 wherein said glass frit is a soda-lime glass.

3. A resistor according to claim 1 wherein said layer is centrally disposed in said resistor and is continuous around its entire periphery.

4. A resistor according to claim 1 wherein said layer is a spot.

5. A resistor according to claim 3 wherein there are spiral grooves in said resistive film providing a resistor path of a predetermined length.

6. A resistor according to claim 4 wherein there are spiral grooves in said resistive film providing a resistive path of a predetermined length and said spot extends across said resistive path.

7. In a tin oxide resistor wherein a tin oxide based film is carried on a non-conductive substrate, the improvement comprising providing a layer of glass frit material over at least a portion of said tin oxide based film which has a melting point below that of said tin oxide film and which when melted reacts chemically with said tin oxide film to render at least a portion thereof non-conductive.

8. A method of open circuiting a tin oxide thin film resistor which comprises providing a layer of glass frit material over at least a portion of said tin oxide thin film having a melting point below said thin film which when melted chemically reacts with said thin film to render it non-conductive, and melting said glass frit material upon overloading said resistor.

*9. An electrical resistor comprising a substrate of electrically insulating material, a thin film of resistance material of a metal oxide coated on said substrate, glass applied on only a portion of said thin film, conducting terminals provided at two ends of said resistor and lead wires soldered to said ends, respectively, and a protective coating formed over the entire surface of said coated substrate, whereby upon receipt of severe load said glass is fused by heat evolved by said resistor film to destroy said thin film thereby permitting the resistor to open circuit in which said resistor is inserted.*

*10. An electrical resistor as claimed in claim 9, wherein said thin film of resistance material is provided with a plurality of grooves determinant of the resistance of the resultant resistor.*

*11. An electrical resistor comprising a substrate of electrically insulating material, a thin film of resistance material of a metal oxide coated on said substrate, a plurality of grooves formed in said thin film on said substrate, glass applied on only a portion of said thin film, conducting terminals provided at two ends of said resistor and lead wire soldered to said ends, respectively, and a protective coating formed over the entire surface of said coated substrate, whereby upon receipt of severe load said glass is fused by heat evolved by said thin film to destroy said thin film thereby permitting the resistor to open a circuit in which said resistor is inserted.*

*12. An electrical resistor as claimed in claim 11, wherein the body of said glass applied on the thin film of resistance material on the substrate extends in parallel relation to the longitudinal axis of said substrate crossing a plurality of the grooves.*

*13. An electrical resistor as claimed in claim 11, wherein the body of said glass applied on the thin film of resistance material on the substrate extends in the form of a ring and located at a substantially intermediate portion of said substrate.*

* * * * *